US012629857B1

(12) United States Patent
Noonkester et al.

(10) Patent No.: US 12,629,857 B1
(45) Date of Patent: May 19, 2026

(54) BARK SHARK LOG SECURING APPARATUS

(71) Applicants: James M. Noonkester, Montgomery Creek, CA (US); Barbara J. Washburn, Montgomery Creek, CA (US)

(72) Inventors: James M. Noonkester, Montgomery Creek, CA (US); Barbara J. Washburn, Montgomery Creek, CA (US)

( * ) Notice: Subject to any disclaimer, the term of this patent is extended or adjusted under 35 U.S.C. 154(b) by 0 days.

(21) Appl. No.: 19/384,770

(22) Filed: Nov. 10, 2025

Related U.S. Application Data

(60) Provisional application No. 63/719,085, filed on Nov. 11, 2024.

(51) Int. Cl.
*B27B 29/00* (2006.01)

(52) U.S. Cl.
CPC .................................... *B27B 29/00* (2013.01)

(58) Field of Classification Search
CPC ................................................ B27B 29/00–10
See application file for complete search history.

(56) References Cited

U.S. PATENT DOCUMENTS 3,747,455 A * 7/1973 Hartzell .................. B27B 29/08 83/403.1
3,782,711 A * 1/1974 Montgomery .......... B27B 29/08 269/31
3,858,868 A * 1/1975 Zagray .................... B27B 29/08 269/182
3,943,808 A * 3/1976 Pryor ....................... B23Q 1/01 83/88
4,245,535 A * 1/1981 Lockwood .......... B27B 17/0091 83/800
4,317,398 A * 3/1982 Jones ..................... B27G 19/10 83/425.2
4,352,488 A * 10/1982 Cremona .................. B27L 5/04 269/54.2
4,445,411 A * 5/1984 Purcell .................... B27B 31/00 83/403.1
4,489,635 A * 12/1984 Cooper ...................... B27B 7/00 83/435.17
5,011,001 A * 4/1991 Cameron ................ B27B 29/08 414/753.1
5,052,455 A * 10/1991 Mason .................... B27L 5/022 144/209.1
5,109,899 A * 5/1992 Henderickson ......... B27B 31/04 83/884

(Continued)

OTHER PUBLICATIONS

Frontier by Norwood Sawmills, "Log-Dog Clamp Kit for 0S35", downoaded Oct. 21, 2025 from https://frontiersawmills.com/products/log-dog-kit-os35?variant=47506534793519, publication date unknown, 4 pages.

*Primary Examiner* — Sean M Michalski
(74) *Attorney, Agent, or Firm* — O'BANION & RITCHEY LLP; John P. O'Banion

(57) ABSTRACT

A tubular apparatus having a first end configured to slip over the screw of a log clamp used in a portable sawmill, and a second end configured with a plurality of serrated teeth. When the log clamp screw is extended it will engage a pin inside the tubular body and force the serrated teeth of the apparatus against a workpiece. The apparatus does not spin, rotate, or drill the workpiece when it is pushed against the workpiece by the log clamp screw.

6 Claims, 2 Drawing Sheets

(56) References Cited

U.S. PATENT DOCUMENTS

| | | | | | |
|---|---|---|---|---|---|
| 5,135,037 | A * | 8/1992 | Wijesinghe | B27B 29/10 | 144/242.1 |
| 5,806,401 | A * | 9/1998 | Rajala | B23D 59/008 | 83/425.2 |
| 6,325,119 | B1 * | 12/2001 | Wolf | B27B 15/08 | 83/365 |
| 6,708,966 | B1 * | 3/2004 | Troudt | B25B 5/067 | 269/6 |
| 7,114,715 | B1 * | 10/2006 | Kirk | B25B 5/166 | 269/6 |
| 7,712,494 | B2 * | 5/2010 | Janzen | B27B 31/04 | 144/359 |
| 8,695,652 | B1 * | 4/2014 | Pattullo | B27B 1/00 | 269/131 |
| 8,837,144 | B1 * | 9/2014 | Allen | E05B 73/0082 | 211/8 |
| 9,308,626 | B2 * | 4/2016 | Chuang | B25B 5/102 | |
| 9,707,364 | B2 * | 7/2017 | Islava | A61M 16/0497 | |
| 9,718,206 | B1 * | 8/2017 | Pattullo | B27B 1/00 | |
| 10,556,326 | B1 * | 2/2020 | Kelly | B25B 5/02 | |
| 10,569,906 | B2 * | 2/2020 | Littlejohn | B64F 5/10 | |
| 11,267,158 | B1 * | 3/2022 | Kilgore | B27C 7/00 | |
| 11,597,637 | B2 * | 3/2023 | Fox | B66F 1/06 | |
| 2004/0226155 | A1 * | 11/2004 | Krukov | B23C 3/04 | 29/27 R |
| 2014/0174603 | A1 * | 6/2014 | Dale | B27B 29/02 | 144/306 |
| 2017/0190034 | A1 * | 7/2017 | Blackford | B25B 5/003 | |
| 2022/0288805 | A1 * | 9/2022 | Wallace | B27B 15/02 | |

* cited by examiner

BARK SHARK LOG SECURING APPARATUS

CROSS-REFERENCE TO RELATED APPLICATIONS

This application claims priority to, and the benefit of, U.S. provisional patent application Ser. No. 63/719,085 filed on Nov. 11, 2024, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to tools, and more particularly to an accessory for a portable sawmill.

2. Background Discussion

Most portable sawmills have a log deck where one "side" of the log butts up against one or more adjustable backstops and the other side of the log is held in place by a log clamp with an adjustable screw. The log clamp is typically a post with a 1-inch diameter log clamp screw that can be rotated by a handle. The handle is rotated such that the 1-inch diameter log clamp screw penetrates the log to hold the log in place. While this approach aids in holding the log in place, it lacks stability. There have also been approaches where a larger diameter head is affixed to the end of the log clamp screw but such approaches lack stability as well. Accordingly, there is a need for an accessory that can be driven into the log by the log clamp screw to better secure the log.

BRIEF SUMMARY

This disclosure describes an accessory for a log clamp in a portable sawmill. The accessory is an apparatus that generally comprises a tubular body with a plurality of serrated teeth positioned at one end (e.g., distal) of the tubular body. In use, the other end (e.g., proximal) of the apparatus is slipped over the end of the log clamp screw. When the log clamp screw is extended it will engage a pin inside the tubular body and force the serrated teeth of the apparatus against the log. Note in this regard that the apparatus does not spin, rotate, or drill; it just sits stationary on the log clamp screw and is pushed against the log.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 1:
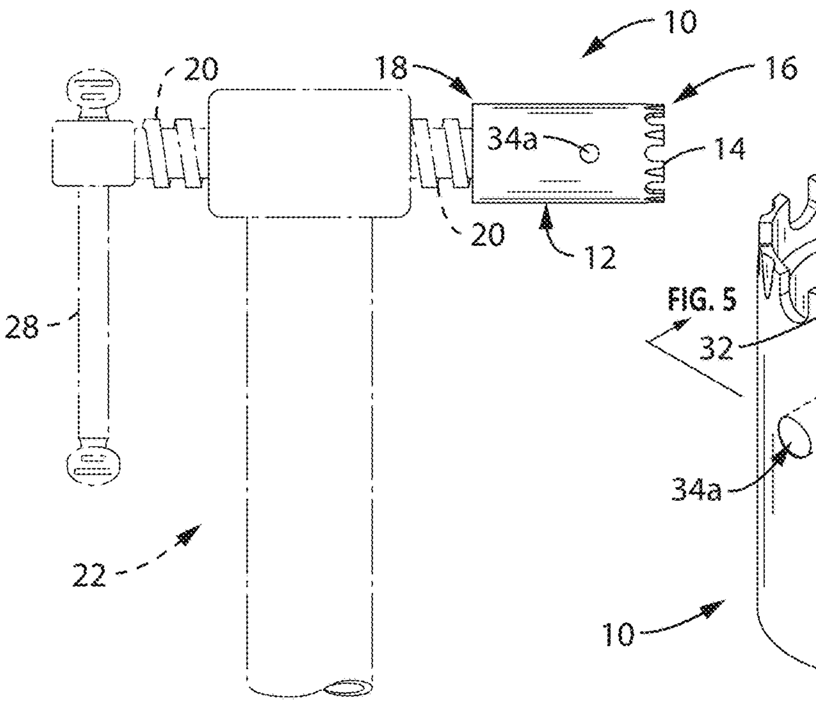
FIG. 1 is a side view of an embodiment of a log securing apparatus according to the technology of this disclosure shown in context of use with a log clamp which is depicted in broken lines.
Figure 2:
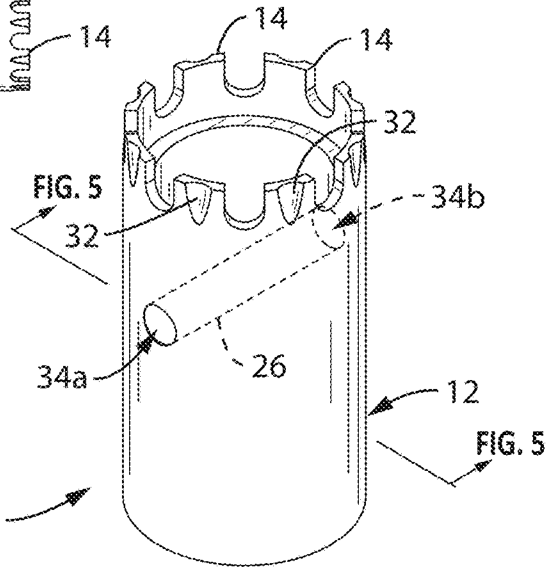
FIG. 2 is a perspective view of the apparatus.
Figure 3:
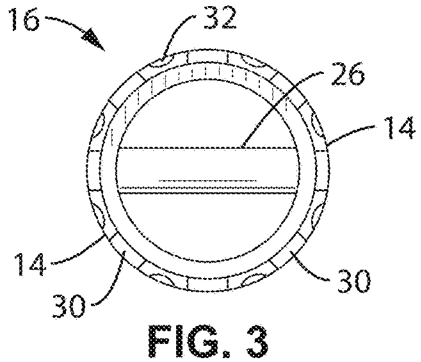
FIG. 3 is a front end view of the apparatus.
Figure 4:
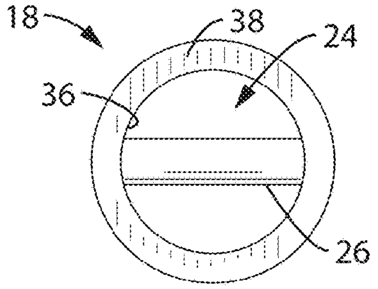
FIG. 4 is a rear end view of the apparatus.

By way of example, and not of limitation, this disclosure describes a log securing apparatus for use with the screw-type log clamp found in a portable sawmill. For purposes of this disclosure, the apparatus will be referred to as a "Bark Shark" apparatus.

Referring to FIG. 1 through FIG. 6, a Bark Shark apparatus 10 generally comprises a tubular body 12 with a plurality of spaced-apart serrated teeth 14 positioned at its distal end 16. The plurality of serrated teeth 14 are configured for engagement with a workpiece such as a log or other wood material (not shown) The proximal end 18 of the apparatus is configured for engagement with the log clamp screw 20 of a log clamp 22 commonly found in a portable sawmill. In the embodiment shown, the log clamp screw 20 will fit within an opening 24 in the proximal end 18 of the apparatus 10.

To use the apparatus, the user slips the proximal end 18 of the apparatus 10 over the log clamp screw 20 until the end of the log clamp screw 20 butts up against a cross-pin 26 inside the tubular body of the apparatus. According, when the log clamp screw 20 is extended by rotating the handle 28 of the log clamp 22, the apparatus 10 will be "pushed" in the distal direction (to the right in FIG. 1) and apply pressure to the workpiece. In this regard, it is noted that the proximal opening 24 preferably has a larger diameter than the diameter of the log clamp screw 20 so that the apparatus 10 generally does not spin, rotate, or drill when the log clamp screw is rotated. Instead, the apparatus 10 is held in place by the log clamp screw 20 and is guided and pushed against the workpiece.

EXAMPLE

Figure 5:
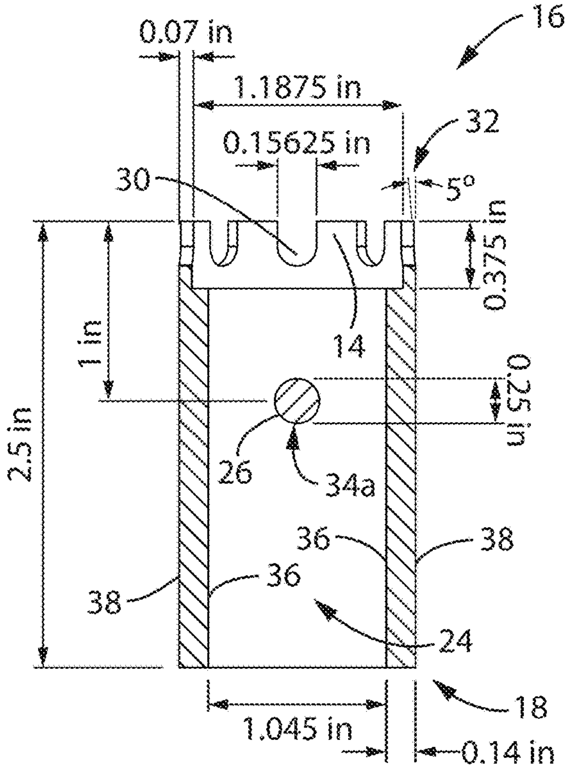
FIG. 5 is a cross-sectional view of the apparatus, taken through line 5-5 of FIG. 1, with exemplary dimensions.

Referring also to FIG. 5, the tubular body 12 can be fabricated from an approximately 2½ long section of 1-inch metal pipe (e.g., water pipe). Typically, 1-inch metal water pipe has an inner diameter of about 1.045 inches and a wall thickness of about 0.140 inches. All dimensions in this example are approximate and can vary, and are provided as a non-limiting working example. It is also contemplated that the apparatus can be scaled in size based on the size of the log clamp with which the apparatus is used.

In this example, the distal end 16 of the body 12 is bored out to a depth of approximately ⅜ inches to approximately ½ inches (about 0.375 inches to about 0.5 inches) using an approximately 1³⁄₁₆ inch (about 1.1875 inch) drill bit or the like. Based on typical wall thicknesses of 1-inch metal water pipe, this results in a wall thickness of approximately 0.070 inches in the bored out region.

The plurality of spaced-part serrated teeth 14 are formed around the circumference of the distal end of the body. In this example, there are eight such serrated teeth 14 which are separated by approximately ⁵⁄₃₂ inch (about 0.15625 inch) wide gaps 30 having an approximate depth of ¼ inches to ⁵⁄₃₂ inches (about 0.25 inches to about 0.15625 inches). The serrated teeth can be formed by, for example, filing the distal end 16 of the body 12 with an approximately ⁵⁄₃₂ inch (about 0.15625 inch) diameter round file thus creating gaps 30 in the wall 38 of the body 12. For a 1-inch metal water pipe, eight such serrated teeth and gaps can be formed.

To create the serrations on the serrated teeth, the outer surface of each tooth is cut or ground at about a five degree (5°) angle with an approximately ⁵⁄₃₂ inch (about 0.15625 inch) curvature. This can be accomplished, for example, by filing the outer surface of each tooth with an approximately ⁵⁄₃₂ inch (about 0.15625 inch) diameter round file. As a result, each tooth will have a corresponding outer serration 32 as illustrated. The plurality of serrated teeth 14 are thusly configured for engaging the workpiece. It will be appreciated that the serrations could also be located on the inner surfaces of the teeth, be arranged on the inner and outer surfaces in an alternating or other periodic configuration, or be present on both the inner and outer surface of a tooth.

In one embodiment, a pair of approximately ¼ inch (about 0.25 inch) diameter opposing holes 34*a*, 34*b* are drilled or otherwise formed through the wall of the tubular body at a location approximately 1 inch centerline from the distal ends of the serrated teeth. A pin 26, having an approximately ¼ inch (about 0.25 inch) diameter, is inserted through the holes and thus spans the interior of the tubular body. The pin 26 can have a diameter slightly larger than the holes 34*a*, 34*b* so that it can be driven through the holes and secured by frictional engagement, or the pin 26 can be secured by welding the ends to the metal wall 38, or the pin 26 can be secured by other securement techniques known to those skilled in the art of metalworking.

The inside surface 36 of the wall 38 of the tubular body 12 in the area proximal to the pin 26 preferably is smooth, and the opening 24 is sized such that the apparatus 10 can be slipped over the log clamp screw 20, such that the log clamp screw 20 thusly can rotate freely within the opening 24. Referring to FIG. 5, for example, the approximately 1.045 inch diameter of opening 24 will accommodate a 1-inch diameter log clamp screw 20 in this manner. The slightly larger opening 24 will allow the apparatus 10 to slip over the log clamp screw 20 and allow the log clamp screw 20 to rotate freely within the opening 24.

Figure 6:
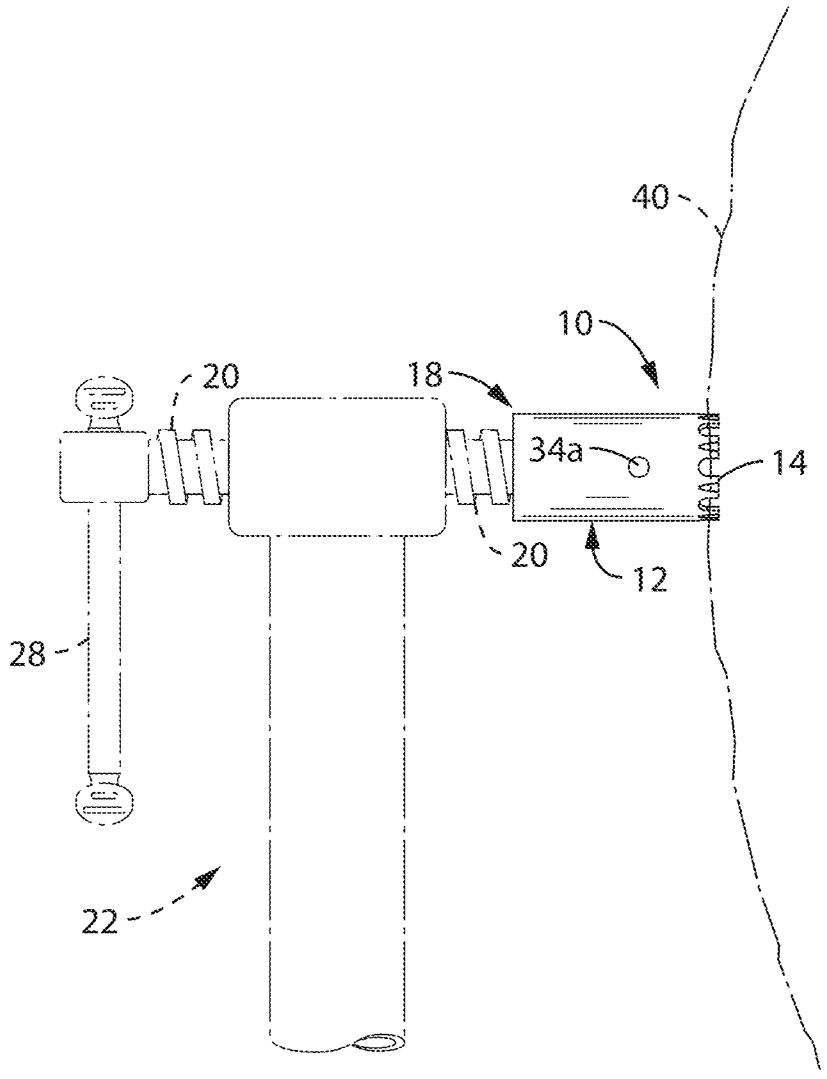
FIG. 6 is a side view of the log securing apparatus of the present disclosure shown in context of use with a log clamp which is depicted in broken lines and also shown in context of use with a log depicted in broken lines.

Referring also to FIG. 6, when the log clamp screw 20 is rotated, its engagement with the pin 26 will cause the apparatus to extend toward the log 40 and the serrated teeth 14 will eventually engage the log 40. When the serrated teeth 14 engage and potentially penetrate the log 40 from the force applied by the log clamp screw 20, the apparatus 10 will remain rotationally stationary while the log clamp screw 20 will continue to rotate and push the apparatus 10 against the log 40 until tight. Accordingly, the apparatus 10 will not spin, rotate or drill in response to rotation of the log clamp screw 20.

From the description herein, it will be appreciated that the present disclosure encompasses multiple implementations of the technology which include, but are not limited to, the following:

An apparatus for securing a log with a screw-type log clamp in a portable sawmill, the apparatus comprising: a tubular body having a first end and a second end; an opening between the first end and the second end of the tubular body; the opening defined by a wall in the tubular body; a plurality of teeth at the second end of the tubular body; and a pin spanning the opening in the tubular body and secured by the wall; wherein the first end of the tubular body is configured to slip over a log clamp screw in a log clamp of a portable sawmill; and wherein the log clamp screw engages the pin and extends the tubular body when the log clamp screw is extended.

The apparatus of any preceding or following implementation, wherein each of the teeth has a surface with a curved serration.

The apparatus of any preceding or following implementation, wherein the plurality of teeth are configured to engage a workpiece when the log clamp screw is rotated, and wherein the apparatus is configured not to rotate when the log clamp screw is rotated after the plurality of teeth engage the workpiece.

The apparatus of any preceding or following implementation, wherein the wall has a smooth inside surface between the first end of the tubular body and the pin.

The apparatus of any preceding or following implementation, wherein the tubular body has a first inner diameter at the first end and a second inner diameter at the second end, and wherein the second inner diameter is smaller than the first inner diameter.

An apparatus for securing a log with a screw-type log clamp in a portable sawmill, the apparatus comprising: a tubular body having a first end and a second end, the tubular body having a first inner diameter at the first end and a second inner diameter at the second end, wherein the second inner diameter is less than first inner diameter; an opening between the first end and the second end of the tubular body; the opening defined by a wall in the tubular body; a plurality of serrated teeth at the second end of the tubular body; and a pin spanning the opening in the tubular body and secured by the wall; the wall having a smooth inside surface between the first end of the tubular body and the pin; wherein the first end of the tubular body is configured to slip over a log clamp screw in a log clamp of a portable sawmill, wherein the log clamp screw engages the pin and extends the tubular body when the log clamp screw is extended; wherein the plurality of serrated teeth are configured to engage a workpiece when the log clamp screw is rotated; and wherein the apparatus is configured not to rotate when the log clamp screw is rotated after the plurality of serrated teeth engage the workpiece.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "substantial", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to +5%, less than or equal to +4%, less than or equal to +3%, less than or equal to ±2%, less than or equal to ±1%, less than or equal to +0.5%, less than or equal to ±0.1%, or less than or equal to ±0.05%. For example, "substantially" aligned can refer to a range of angular variation of less than or equal to ±10°, such as less than or equal to 5°, less than or equal to 4°, less than or equal to 3°, less than or equal to ±2°, less than or equal to 1°, less than or equal to 0.5°, less than or equal to 0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

All text in a drawing figure is hereby incorporated into the disclosure and is to be treated as part of the written description of the drawing figure.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for securing a log with a screw-type log clamp in a portable sawmill, the apparatus comprising:

a tubular body having a first end and a second end;

an opening between the first end and the second end of the tubular body;

the opening defined by a wall in the tubular body;

a plurality of teeth at the second end of the tubular body; and a pin spanning the opening in the tubular body and secured by the wall;

wherein the first end of the tubular body is configured to slip over a log clamp screw in a log clamp of a portable sawmill; and wherein the log clamp screw engages the pin and extends the tubular body when the log clamp screw is extended.

2. The apparatus of claim 1, wherein each of the teeth has a surface with a curved serration.

3. The apparatus of claim 1, wherein the plurality of teeth are configured to engage a workpiece when the log clamp screw is rotated, and wherein the apparatus is configured not to rotate when the log clamp screw is rotated after the plurality of teeth engage the workpiece.

4. The apparatus of claim 1, wherein the wall has a smooth inside surface between the first end of the tubular body and the pin.

5. The apparatus of claim 1, wherein the tubular body has a first inner diameter at the first end and a second inner diameter at the second end, and wherein the second inner diameter is smaller than the first inner diameter.

6. An apparatus for securing a log with a screw-type log clamp in a portable sawmill, the apparatus comprising:

a tubular body having a first end and a second end, the tubular body having a first inner diameter at the first end and a second inner diameter at the second end, wherein the second inner diameter is less than first inner diameter;

an opening between the first end and the second end of the tubular body;

the opening defined by a wall in the tubular body;

a plurality of serrated teeth at the second end of the tubular body; and a pin spanning the opening in the tubular body and secured by the wall;

the wall having a smooth inside surface between the first end of the tubular body and the pin;

wherein the first end of the tubular body is configured to slip over a log clamp screw in a log clamp of a portable sawmill, wherein the log clamp screw engages the pin and extends the tubular body when the log clamp screw is extended;

wherein the plurality of serrated teeth are configured to engage a workpiece when the log clamp screw is rotated; and wherein the apparatus is configured not to rotate when the log clamp screw is rotated after the plurality of serrated teeth engage the workpiece.

* * * * *